(12) United States Patent
Thomsen et al.

(10) Patent No.: US 10,641,249 B2
(45) Date of Patent: May 5, 2020

(54) TRANSPORT FRAME FOR A WIND TURBINE BLADE

(71) Applicant: Vestas Wind Systems A/S, Aarhus N. (DK)

(72) Inventors: Peter Frans Thomsen, Ringkøbing (DK); Adrian Botwright, Sabro (DK); Troels Vahle, Grenaa (DK); Lucia Quintana, Vejle (DK); Jacob Antonsen, Aarhus N. (DK); Kristoffer Lolk Fredriksen, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/067,179

(22) PCT Filed: Dec. 28, 2016

(86) PCT No.: PCT/DK2016/050471
§ 371 (c)(1),
(2) Date: Jun. 29, 2018

(87) PCT Pub. No.: WO2017/114535
PCT Pub. Date: Jul. 6, 2017

(65) Prior Publication Data
US 2019/0010931 A1      Jan. 10, 2019

(30) Foreign Application Priority Data
Dec. 30, 2015  (GB) .................................. 1523124.4

(51) Int. Cl.
*F03D 13/40* (2016.01)
*B60P 3/40* (2006.01)

(52) U.S. Cl.
CPC ................ *F03D 13/40* (2016.05); *B60P 3/40* (2013.01); *F05B 2230/604* (2013.01);
(Continued)

(58) Field of Classification Search
CPC .......... F03D 13/40; B60P 3/40; F05B 2260/02
See application file for complete search history.

(56) References Cited

U.S. PATENT DOCUMENTS

| | | | |
|---|---|---|---|
| 3,083,670 A | | 4/1963 | Harlander |
| 3,791,708 A | * | 2/1974 | Signore ................. E05B 65/462 312/221 |

(Continued)

FOREIGN PATENT DOCUMENTS

| | | |
|---|---|---|
| DE | 202015006216 U1 | 10/2015 |
| EP | 2487363 A1 | 8/2012 |

(Continued)

OTHER PUBLICATIONS

European Patent Office, International Search Report and Written Opinion in PCT Application No. PCT/DK2016/050471, dated Mar. 31, 2017.

(Continued)

*Primary Examiner* — Lynn E Schwenning
(74) *Attorney, Agent, or Firm* — Wood Herron & Evans LLP

(57) ABSTRACT

Transport frame and method; the transport frame having a longitudinal, lateral and upright extent, and being configured for receiving a tip or root portion of a longitudinally extending wind turbine blade, said frame being stackable with similar frames, said frame comprising four upright frame struts which together define a generally cuboid internal space having a longitudinal extent between two pairs of said upright struts; said frame having, within said generally cuboid internal space, a tip or root saddle assembly comprising a saddle with a support surface shaped to receive a respective blade root or tip; said frame furthermore having four top shoulders and four feet, said feet of said frame being conformed to be stackable on corresponding said shoulders of another frame; and wherein said frame, proximate one or (Continued)

more said top or bottom corner thereof, comprises a retractable arm arrangement; wherein said frame further comprises, proximate at least one said top or bottom corner thereof, a claw arrangement; said retractable arm arrangement being configured to fixingly engage a corresponding claw arrangement at an adjacent similar frame in a stacked arrangement of the frames.

16 Claims, 7 Drawing Sheets

(52) U.S. Cl.
CPC ....... *F05B 2260/02* (2013.01); *F05B 2260/30* (2013.01); *Y02E 10/72* (2013.01); *Y02P 70/523* (2015.11)

(56) References Cited

U.S. PATENT DOCUMENTS

| | | | |
|---|---|---|---|
| 5,022,546 | A | 6/1991 | Bock |
| 2007/0189895 | A1 | 8/2007 | Kootstra et al. |
| 2012/0192420 | A1* | 8/2012 | Krogh ................ F03D 13/40 29/889 |
| 2014/0124468 | A1 | 5/2014 | Lundrigan et al. |
| 2014/0305743 | A1* | 10/2014 | Poulsen ............. B65G 1/0442 187/244 |
| 2015/0198140 | A1* | 7/2015 | Sigurdsson ............ A47B 81/00 211/60.1 |
| 2015/0300314 | A1* | 10/2015 | Van Der Zee ............ F16B 2/08 211/85.8 |
| 2017/0159646 | A1* | 6/2017 | Thomsen ................ F03D 13/40 |
| 2017/0370346 | A1* | 12/2017 | Botwright ............. B63B 35/003 |

FOREIGN PATENT DOCUMENTS

| | | |
|---|---|---|
| EP | 2628945 A2 | 8/2013 |
| EP | 2708731 A2 | 3/2014 |
| EP | 2796709 A1 | 10/2014 |
| JP | S56130251 U | 10/1981 |
| JP | H05302364 A | 11/1993 |
| JP | 2013508654 A | 3/2013 |
| WO | 2015035997 A1 | 3/2015 |
| WO | 2015144180 A1 | 10/2015 |
| WO | 2015149809 A1 | 10/2015 |
| WO | 2016008530 A1 | 1/2016 |

OTHER PUBLICATIONS

Intellectual Property Office, Search Report in GB1523124.4, dated Jul. 8, 2016.
Japanese Patent Office, Notice of Reasons for Refusal in JP Application No. 2018-534858, dated Oct. 29, 2019.
China National Intellectual Property Administration, First Notification of Office Action in CN Application No. 201680082857.X, dated Jul. 29, 2019.

* cited by examiner

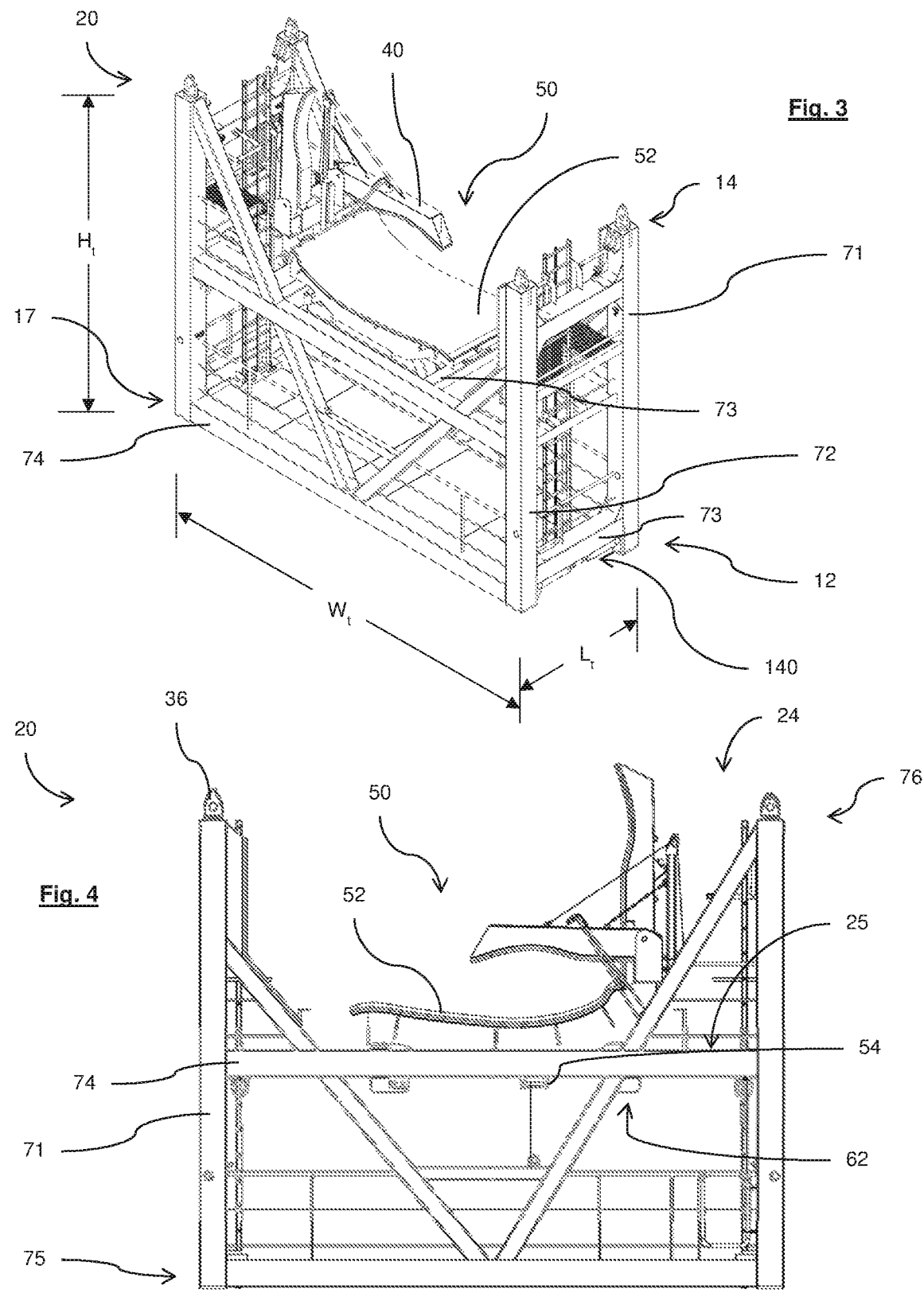

TRANSPORT FRAME FOR A WIND TURBINE BLADE

The present invention relates to the field of storage, transportation and handling of large elongate objects, in particular wind turbine blades.

In this context, a special set of logistical requirements interacts with a wide variety of technical and cost constraints, to pose technical challenges for effective or optimal solutions. The ever-increasing size and weight of individual blades adds to these challenges. In general, it may be said that after their construction, wind turbine blades undergo a series of handling and storage stages from their production site to their installation location. These stages may include initial storage at a production site, transportation from a production site to an installation site or to an interim storage or marshalling site. There may be further transportation between one or more interim storage or marshalling sites to an installation site. Each interim storage stage may include transferring steps in which blades are lifted off a first transportation platform and on to another. One or more transport stages may include sea transport, or rail or truck transport. Storage and handling solutions are sometimes optimised for individual stages of the transition between production and installation. To that end, there may be provided a whole range of support or storage solutions, each individually configured for a particular storage or transport stage and requiring repeated switching between different storage or transport structures. This is costly, time-consuming and can increase the tendency to inflict damage or wear on blades. There can be many advantages arising from devising a blade handling solution which facilitates multiple stages of the transportation process as a whole, including interim storage stages.

The present invention seeks to provide an effective wind turbine blade transport and handling solution which addresses the needs to ensure damage-free transportation of the blades, quick handling during transfers whether between transport platforms or between storage and transportation stages, as well as safety and ease of use by personnel. In aspects, special consideration has been given towards transportation by shipping. In aspects, special consideration has been given towards both ensuring secure retention and support of blades in transport frames, and to simplifying operations and procedures.

Wind turbine blade support and transportation devices are known in which a frame element is applied at a blade root while another co-operating frame element is provided outboard of a blade root region, often in a mid- or tip region. These may be referred to as root- and tip frames respectively. In some cases, these may be stackable thereby allowing several blades to be supported lying more or less horizontal or slightly inclined, and stacked atop one another. EP2708731 recites stackable wind turbine blade frames in which each frame is provided at its upper and lower corners with ISO container corner castings. These ensure that the transport frames can be lifted. Moreover, it is known in the art to stack containers atop one-another, in particular using twistlock elements interposed between adjacent corner castings in a stack. EP2796709 discloses transport and storage fittings for a wind turbine blade with a set of root and tip storage fittings for storing a blade in one pitch orientation. The frames may be stacked atop one another with the help of locating mountings. According to that document, lifting of a transport frame is by means of a crane connected to additionally provided lifting eyelets. WO2015149809 discloses a still further stackable frame arrangement.

It would be desirable to provide a transport frame design which would enable secure transportation in a stacked arrangement, especially during shipping and which would enable lifting of multiple blades in a stack. It would be especially desirable to provide such a solution for use in connection with larger blades, especially offshore blades. It has previously been known to bind blade frames together in order to simultaneously lift a stack of blades in pairs or in threes. It has also been suggested in EP2487363 to lift a stack of blades as a pack by lifting them from beneath.

The present invention sets out to provide improvements to known blade transport frames with a view in particular to ensuring easy usage by operators, reliable transportation in a stacked configuration and which may be capable of providing a simplified arrangement for lifting blades in a stack.

SUMMARY OF THE INVENTION

In particular, the invention provides a transport frame having a longitudinal, lateral and upright extent, and being configured for receiving a tip or root portion of a longitudinally extending wind turbine blade, said frame being stackable with similar, or identical, frames. The frame comprises four upright frame struts which together define a generally cuboid internal space having a longitudinal extent between two pairs of said upright struts. The frame has, within said generally cuboid internal space, a tip or root saddle assembly comprising a saddle with a support surface shaped to receive a respective blade root or tip. The frame furthermore has four top shoulders preferably at or near four top corners thereof and four feet preferably at or near four bottom corners thereof. The feet of are conformed to be stackable on corresponding shoulders of another similar or identical frame. Furthermore, the frame, proximate one or more top or bottom corner thereof, comprises a retractable arm arrangement. The frame further comprises, proximate at least one said top or bottom corner thereof a claw arrangement. And wherein the retractable arm arrangement is configured to fixingly engage a corresponding claw arrangement at an adjacent similar frame in a stacked arrangement of the frames. The arms thereby constitute stable connectors between adjacent frames. This arrangement ensures a stable engagement between stackable frames, susceptible to withstand vibrations, shocks or rocking motions, for example during transport. The arrangement may thereby permit reduced use of lashings at a stack of these frames during transport, thereby facilitating the operations logistics of blade transportation. Moreover, such an arrangement may additionally facilitate lifting a stack of said blades in respective frames by suspending them from a topmost frame, which topmost frame may be grasped during lifting a frame stack.

Preferably, a retractable arm and a claw comprise a tensioner capable of creating a fixed engagement between them under tension. Preferably, in embodiments, said arm may be rigid and inflexible. Preferably said arm may be of a high tensile metallic material such as steel, high grade steel or alloys of titanium. Preferably, in embodiments, a said claw may be rigid and inflexible. Preferably said claw may be of a high tensile metallic material such as steel, high grade steel or alloys of titanium. Such an arrangement may greatly increase stability of stacked frames, especially during transport. Moreover, the tensioned connecting arm may further improve the capability to lift stacked frames by suspending them from a topmost frame being lifted.

Optionally a retractable connecting arm, preferably each retractable connecting arm, may include a tensioner. The arrangement thereby benefits from convenience and fewer separate parts. Also optionally, a said tensioner may preferably be manually operable by an operator. Preferably using hand tools and preferably without using power, to apply tension between a retractable arm and a claw. Thereby, tension is applied between two adjacent stacked frames, preferably without powered equipment. Optionally, a retractable arm may be hingedly retractable at the frame, in such a way as thereby not to protrude beyond said frame when in a retracted position. A sliding or telescopic arrangement may also be employed as an alternative or equivalent.

Preferably, the retractable arm arrangement may comprise a gang of two or more retractable arms and wherein the claw arrangement may comprises two or more claws. Preferably three said retractable arms and three said claws may constitute a gang. This improves the stability characteristics of a stack of blade frames during either transportation or lifting because even while manual attachment of the arm connectors with the claws may be used, there may nevertheless be a high level of tension applied at each interface between adjacent frames. The effect of providing a gang of these connectors is thereby to greatly increase the level of tension which can be applied without resorting to the use of powered equipment for engaging the connectors. Any claw of a claw assembly may in particular preferably be a fixing claw. A fixing claw may in particular be fixed in position, preferably rigidly fixed to a relevant transport frame, preferably fixed to a strut of a said frame. A claw arrangement may thereby preferably be a fixing claw arrangement, preferably a fixed claw arrangement.

Optionally, each retractable arm at said retractable arm arrangement may be individually and separately movable into engagement with a corresponding claw at said claw arrangement. This ensures that each retractable arm may be connected separately and preferably tensioned individually. This arrangement may enhance the preferred aim of maximising the applied tension between adjacent frames using minimal means.

Optionally, a retractable arm may comprise a cavity dimensioned to accommodate a claw therein, when in an engagement position of said arm. Said cavity may be dimensioned to receive a retaining catch when said arm is in a said retracted position.

Preferably, the retractable arm arrangement may be provided at two or more, preferably at three or four said top or bottom corners of a respective frame. The provision of multiple retractable arm connector arrangements at each frame may further increase the attainable connecting tension between adjacent frames in a stack. Preferably, a claw arrangement may be provided at two or more, preferably at three or four top or bottom corners thereof. Most preferred is to provide a retractable arm arrangement and a fixed claw arrangement at every top or bottom corner of a said frame, in particular at a top shoulder or bottom foot thereof.

Optionally, each or any said shoulder may be additionally provided with a raised abutment having a height above the shoulder, wherein each foot may additionally be provided with a recess conformed to receive the abutment in a locating engagement in a stacked configuration of similar or identical frames. The locating engagement may be a close fitting engagement or a small tolerance fit may be permitted. The engagement between a foot recess and a shoulder abutment may assist in providing stability against lateral shear action between stacked frames under sideways loads or shocks. Nevertheless, it may be preferred for the tension between adjacent stacked frames to be sufficient to overcome the shear tendency under lateral shocks during transport. When enough tension can be applied between adjacent frames, the stability of a stack may be greatly increased thereby further reducing the need for applying lashings to stacked frames. This arrangement may thereby allow significant forces or shocks to be dissipated between the lowermost frame of a stack and the surface on which it rests. In embodiments, during transport, the lowermost frame may be secured to the transport surface, for example on fixed bosses or other equivalents.

Still further advantageously, two or more or each frame shoulder may be additionally provided with an upwardly protruding locating finger, each finger having a height above the shoulder, and wherein each finger is provided with a lifting aperture configured as a load bearing lifting point for lifting a frame or a stack of frames. According to this embodiment, it is enabled that a topmost one of a set of stacked frames, possibly including a stack of blades, may be lifted using lifting points at upwardly protruding fingers. The finger shape may additionally assist in guiding or locating a lifting element on a frame or frame stack. Moreover, preferably one or more said finger may include an anchor portion extending below the shoulder, into the body of said frame, preferably into a strut thereof. The considerable loads involved in lifting a stack of blades such as large, onshore or offshore blades may thereby be better dissipated at a frame top, making possible to lift from above the frames, preferably without additionally needing to fasten other, lower frame portions to the relevant lifting element.

In embodiments the retractable arm assembly may additionally comprise, for each retractable arm thereof, a catch configured to securely retain the retractable arm in a retracted position at the frame. A catch may be engagable with the tensioner at a retractable arm to thereby maintain it in a retracted position.

In embodiments, a retractable arm assembly may be provided at a top corner of a frame, proximate a shoulder thereof, with a corresponding claw arrangement at a bottom corner, proximate a foot thereof. The arms may thereby tend to retract under gravity towards a retracted position, within the frame. The retractable arms may then be released from an retracted position, for example at a catch, and swung upwards to a more or less vertical position for engagement with a claw proximate a foot of an adjacent frame. Alternatively, in embodiments, the retractable arm assembly may be provided at a bottom corner of a frame, proximate a foot thereof, with a corresponding claw arrangement at a top corner, proximate a shoulder thereof. The arms may thereby tend to drop under gravity towards an engaged position extending from one frame to another. The retractable arms may then be released from an engaged position, for example at a catch, and raised upwards to a more or less horizontal position for engagement with a catch proximate a foot of an adjacent frame, possibly at a lower lateral or longitudinal strut thereof.

Optionally, each said upright frame strut of a frame may extend above and below the extent of a blade when supported in the frame.

Accordingly, in a further aspect, there is provided a method for transporting a stack of wind turbine blades, the method including providing a first frame as set forth hereinabove, the frame containing a root or tip portion of a first wind turbine blade, and placing a second, similar or substantially identical frame, which frame also contains a root or tip portion of a second wind turbine blade, atop and adjacent the first frame, in particular by placing a foot of the second frame on a shoulder of the first frame. The method further includes releasing a retractable arm of a retractable arm arrangement from a retracted position thereof and placing it over a corresponding claw of the claw arrangement of the adjacent frame in the stack. The method further includes actuating a tensioner, preferably manually, at the retractable arm, to create a connection under tension between the two adjacent frames in a stack, and transporting the stack of wind turbine blades, in particular aboard a truck, vessel or rail car or other transport platform.

Optionally, the method may further include the step of individually and separately releasing each one of a gang of retractable arms of the retractable arm arrangement from a retracted position thereof and placing each one over a corresponding claw of the claw arrangement of an adjacent frame in a stack. Thereafter, it is preferred to manually actuate each tensioner at each retractable arm to create a connection under tension between two adjacent frames in a stack. Preferably, the method may include repeating this operation at two or more, preferably at three or four corners of a first and a second frame.

In a further embodiment, the method may further include lifting a stack of two or more wind turbine blades by connecting a lifting element which may be for example a lifting bar, yoke, frame, spreader or multiple-legged sling, to the topmost frame of a stack and lifting the frame stack, wherein each frame in each frame stack is suspended from and lifted by the frame immediately above it. Preferably, this may be achieved in that a lifting element grasps only the topmost frame in a stack of frames. Remaining frames in a stack may be lifted by the frame immediately above.

In a further aspect, the or each frame being lifter holds a wind turbine blade root or tip region, and the method includes connecting a lifting element to two or more preferably three or four load-bearing lifting apertures at a locating finger atop a frame, possibly atop a topmost frame in a stack, and lifting the frame or stack of frames suspended by said load bearing lifting apertures. Remaining frames in the stack may be lifted, suspended by said retractable arm connectors and said claws, the retractable arm connectors reaching between adjacent frames in a stack.

The invention may also encompass a stack of frames, interconnected by said retractable arms and said claws. Additional aspects of the invention including various optional features thereof will be explained with reference to the following non-limiting examples including the following drawings in which:

FIG. 3 shows a perspective view of a transport frame which is a tip frame;

FIG. 4 shows a side view of a transport frame which is a tip frame;

Figure 1:
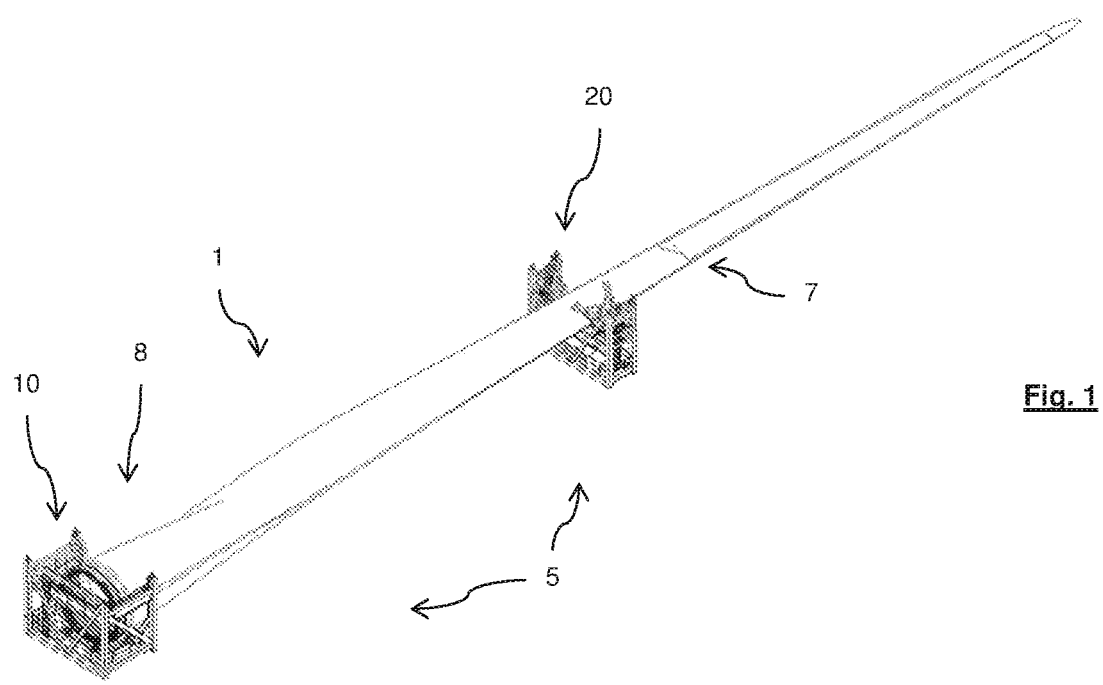
FIG. 1 shows a transport frame pair supporting a wind turbine blade.
Figure 2:
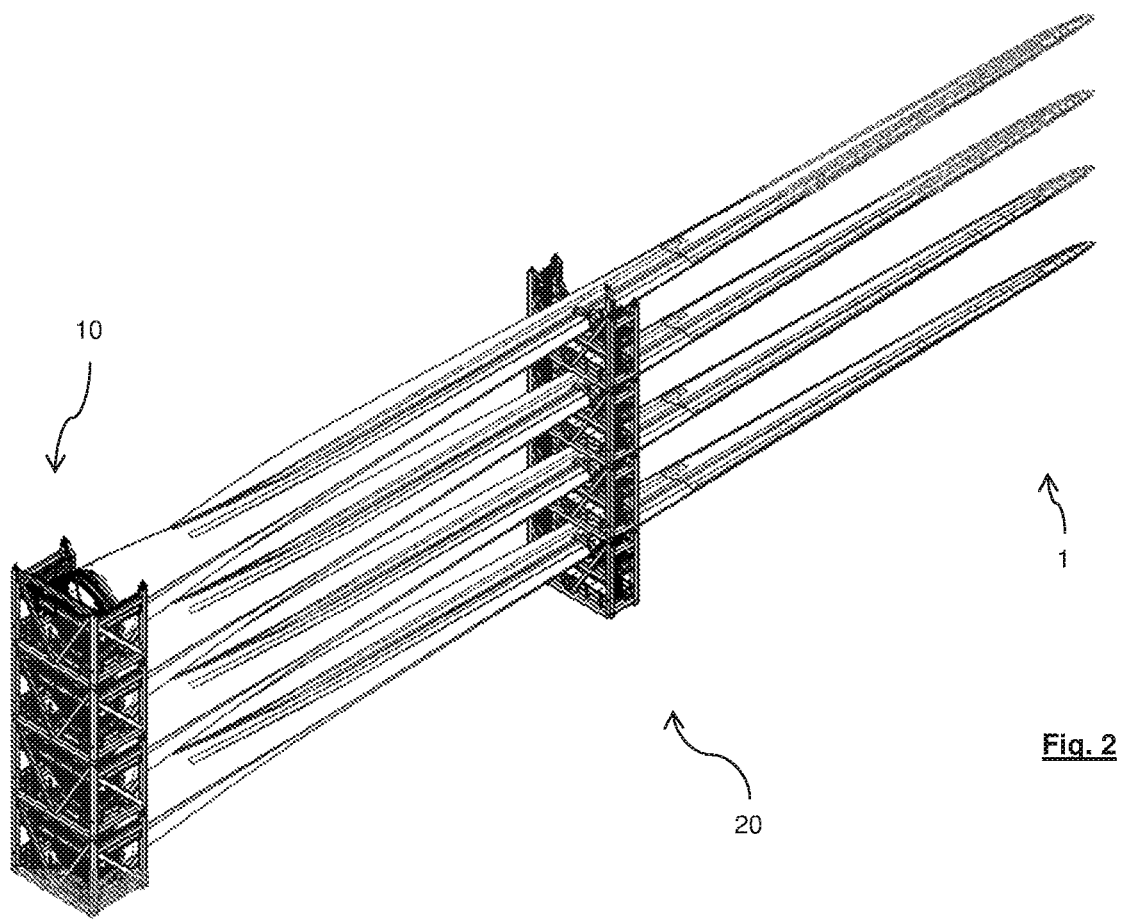
FIG. 2 shows several stacked wind turbine blades supported in a stack of frame pairs.

FIG. 1 illustrates a frame pair consisting of a transport frame 5 in the form of a root frame 10 and a transport frame 5 in the form of a tip frame 20 with a wind turbine blade 1 supported therein in a generally horizontal orientation. A chordwise direction of the blade 1 may also lie generally horizontal when supported in the respective transport frames 5. As is generally understood, the blade 1 extends from a root end in a root region 8 to a tip end in a tip region 7 which may also be correspondingly referred to as a proximal and a distal end respectively. The frames 5 of the frame pair are stackable, as illustrated in FIG. 2. Each root and tip frame 10, 20 includes a respective root saddle assembly 80 and tip saddle assembly 50 as will be described more fully below. In the design illustrated here, each tip and root frame includes a single respective tip- or root saddle assembly 50, 80. Associated with the respective saddle assembly are additional elements for keeping the respective blade root 8 or tip region 7 securely in place in the respective frame 10, 20. For the purposes of the present context, the tip region 7 may also denote a mid-region of a blade 1. Expressed differently, a tip frame 20 may be positioned anywhere between a mid- and a tip-region 7 of a blade 1.

FIG. 2 illustrates a stacked arrangement of multiple blades 1, with each blade supported in a frame pair 10, 20. The stacked arrangement is achieved by stacking the respective root frames 10 on top of each other and the tip frames 20 likewise. To that end, each of the tip frames 20 and root frames 10 is constructed accordingly, as can be seen for example from FIGS. 3 to 5. Preferably, the frame construction in each case includes rigidly connected frame struts, including upright struts 71, 72, 91, 92 extending between a respective root or tip frame base 75, 95 and a respective root or tip frame top 76, 96. Preferably, these respective upright struts 71, 72, 91, 92 may define respective upright extending corner edges of each transport frame 5, extending between respective corners 17. Preferably therefore, respective upright struts may be provided in pairs of proximal upright struts 71, 91 and distal upright struts 72, 92. Lateral struts 74, 94 extend rigidly between upright struts 71, 91, 72, 92, thereby define a respective proximal frame portion and a distal frame portion. Lengthwise struts 73, 93 longitudinally connect respective proximal and distal frame portions. In the example illustrated, lengthwise struts 73, 93 extend between proximal upright struts 71, 91 and distal upright struts 72, 92 or between respective proximal and distal lateral struts 74. The respective frame struts of the tip or root frame 20, 10 thereby define a three dimensional interior space. In the example illustrated here, the tip- and root frame 20, 10 each defines an approximately cuboid interior space inside which a respective tip saddle assembly 50 or root saddle assembly 80 is accommodated. The base 75, 95 of the tip and root frames 20, 10 may describe a substantially rectangular footprint in a lateral and longitudinal plane of the frame.

Figure 5:
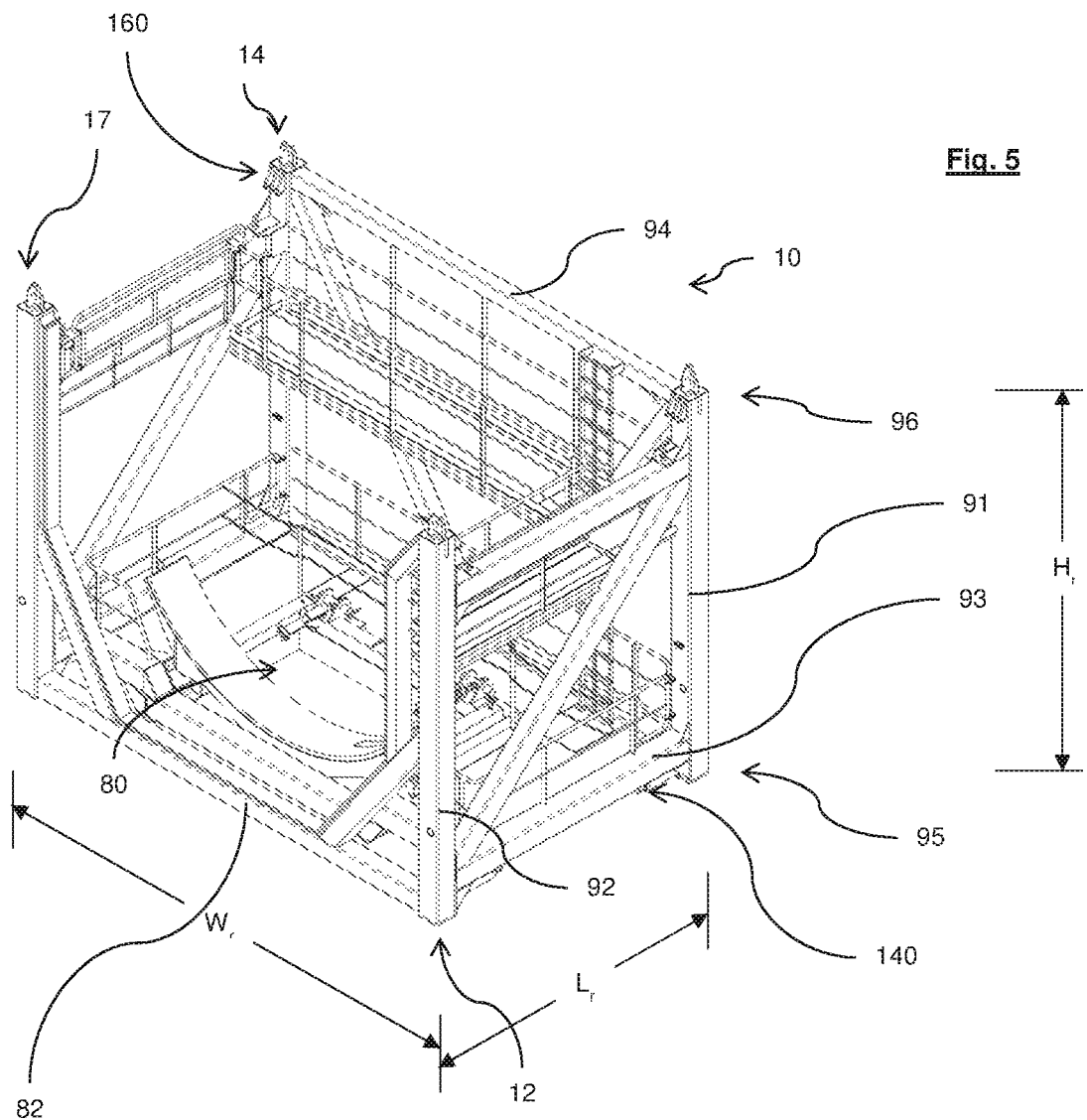
FIG. 5 shows a perspective view of a root frame.

As can be seen from the tip frame 20 illustrated in FIG. 3 and the root frame 10 illustrated in FIG. 5, each frame exhibits a height extent H, a lateral extent W and a lengthwise extent L.

At the top 76, 96 of each tip or root frame 20, 10 there may be provided locating fingers 36 which may co-operate with a recess (not visible in these drawings) at the bottom 75, 95 of the relevant frame. Necessarily, a recess or finger 36 of a first tip or root frame 20, 10 will co-operate to facilitate stacking with the corresponding finger 36 or recess of a similar frame to be stacked atop or beneath.

Stacking frames for storage or stowage, as well as transferring frames off from stacks or onto stacks can be made easier when the effective height dimension $H_t$ of the tip frame 20 of a frame pair is equal to or substantially equal to the effective height $H_r$ of the root frame 10. In this context, the effective height of a frame may correspond to be the distance from a contact surface beneath the frame base 75, 95 on which the frame may rest in e.g. a storage or stowage or transport situation, to the frame top 76, 96, on which a superposed, stacked frame will rest. Preferably, also the effective width dimension $W_t$ of the tip frame 20 of a frame pair may be equal to or substantially equal to the effective width $W_r$ of the root frame 10. In the present context, the effective width of a frame 5 may correspond to the distance between the outermost surface of a proximal 72, 92 or distal 71, 91 pair of upright struts.

FIGS. 3 and 4 show a tip saddle assembly 50 within tip frame 20. The tip saddle assembly 50 comprises a saddle 52 and a saddle support 62. The tip saddle 52 may be configured with a support surface shaped to conform to the shape of a blade surface towards its tip, e.g. in a mid- or tip region thereof. In the illustrated embodiments, the tip saddle is configured to extend between a blade trailing edge 3 and a blade leading edge 2. As can better be seen from FIG. 3, the tip saddle assembly 50 may be supported on longitudinally extending frame struts 73. In particular, the tip saddle support 62 may be supported on longitudinally extending frame struts 73. Preferably, the tip saddle 52 may be slidable in translation in a lengthwise direction of the tip frame 20. This in effect corresponds to a movement of the tip saddle 52 in a lengthwise direction of the blade. Preferably, the tip saddle 52 is capable of sliding freely in the aforementioned lengthwise direction.

A free running translation movement of a tip saddle assembly 50 may be provided in particular by a sliding connection between the tip saddle assembly 50 and the tip frame 20. In particular, a tip saddle support 62 may be slidable along a track formed or supported by longitudinally extending frame struts 73. The sliding action may be enhanced by providing low-friction surface strips 54 on the tip saddle support 62 at its contact surfaces with the tip-frame 20. In the example shown, the tip frame 20 sliding surface is provided on a longitudinally extending strut 73.

Also shown in FIGS. 3-4 are clamping arms 40 for securing the blade mid- or tip-end on the tip saddle 52 in the tip saddle assembly 50. According to aspects of the invention, one or more such clamping arms 40 may be provided in connection with a tip saddle assembly 50, in particular as part thereof. In the example shown, two clamping arms 40 are provided in association with each transport frame 5, in particular, associated with each tip saddle 52 and tip saddle assembly 50. A clamping arm 40 may be opened to allow insertion or removal of a blade 1 into or from a tip frame 20. A clamping arm 40 may be closed to keep the blade in place. In aspects of the invention, a first and a second clamping arm 40 may be provided mounted at a proximal end thereof to a single tip saddle assembly 50, preferably at a hinge point. Preferably, In FIG. 3, a proximal clamp arm 40 is shown closed, while a distal clamp arm 40 is shown open for illustrative purposes. A raising and lowering apparatus may be provided for operating the clamping arms 40. The provision of more than one clamping arm 40 at a tip saddle assembly may allow for larger blades to be effectively clamped in a tip saddle assembly 50 while at the same time keeping each clamping arm 40 down to a size and weight such as to allow manual operation by an operator, preferably using tools such as hand tools and preferably not using power or powered tools.

FIGS. 1 and 2 illustrate a blade 1 with its root portion 8 in a root transport frame 10 and a blade mid-portion 7 in a tip transport frame 20. The blade is lying substantially horizontally with its chordwise extent at a mid-portion 7 thereof also directed in a generally horizontal direction. In the embodiment illustrated, the free end of a closed clamping arm 40 reaches across the blade longitudinal main axis and extends approximately half way across the chordwise extent of the blade in the tip saddle assembly 50. An operator in an operating position 24 on a platform 25 in the tip transport frame 20 is able to reach all the relevant controls for installing or releasing a blade 1 into or from the frame.

As shown in FIG. 5, a root saddle assembly 80 may be provided in a root frame 10 of a frame pair. The root saddle assembly 80 is in particular preferably connected to the root frame 10 in such a way that translation movement of the root saddle assembly 80 relative to the root frame 10 is excluded. A root saddle 82 may be configured with a support surface shaped to conform to the shape of a blade surface at its root. The root saddle 82 may thereby appropriately have an arcuate blade root support surface. The root saddle assembly 80 may include clamps or clamp attachments or other fittings for securely holding the blade root in the root saddle 80.

These may be in the form of brace attachments and/or in the form of root restrainers. Root restrainers may in particular be configured to be attached to stud-bolts protruding from a blade root and thereby prohibit longitudinal movement of a blade 1 in a root frame 10.

In accordance with aspects of the invention, it is preferred for the root frame 10 of a pair to have an effective length $L_r$ greater than the effective length $L_t$ of the tip frame 20. In this context, the effective length of a frame 10, 20 may correspond to the distance between the most proximal surface of a proximal upright strut 72, 92 and the most distal surface of a distal upright strut 71, 91. Still preferably, the effective length $L_r$ of the root frame 10 of a frame pair may be at least twenty percent greater than the effective length $L_t$ of the tip frame 20. Still preferably, the effective length $L_r$ of the root frame 10 of a frame pair may be at least thirty percent greater than the effective length $L_t$ of the tip frame 20. Still preferably, the effective length $L_r$ of the root frame 10 of a frame pair may be at least forty percent greater than the effective length $L_t$ of the tip frame 20. The stability of a root frame 10 or root frame stack may thereby be further enhanced. Moreover, the overall stability of a frame pair or of stacked frame pairs may thereby be enhanced owing to the increased propensity for load dissipation through the root frame 10 or root frame stack while underway. The larger lengthwise dimension of a root frame may furthermore reduce the need for lashings between a transport surface and a root frame 10 or root frame stack. In this context, it may be appreciated that the internal volume defined by a tip frame 20 may preferably be at least twenty percent less or at least thirty or forty percent less than the internal volume defined by a root frame 10.

Also visible in the tip frame 20 and root frame 10 illustrated in respective FIGS. 3 and 5 is a retractable arm arrangement 140 positioned, according to the illustrated embodiment, at a corner 17 of a frame, in particular at a bottom portion 75, 95 of the respective frame. Also visible in these figures is a claw arrangement 160 positioned, according to the illustrated embodiment, at a corner 17 of a frame, in particular at a top portion 76, 96 of the respective frame. It is within the scope of the invention for the positions of these elements, notably the retractable arm arrangement 140 and the claw arrangement 160 to be inverted, namely for a retractable arm arrangement 140 to be positioned at a top portion 76, 96 of the respective frame, whereas the claw arrangement 160 may be positioned at a bottom portion 75, 95 of the respective frame. In embodiments frame 5, may have some retractable arm assemblies at top portions 76, 96 thereof and some at bottom portions 75, 95 thereof. Correspondingly, in these embodiments frame 5, may have some fixed claw arrangements at top portions 76, 96 thereof and some at bottom portions 75, 95 thereof. Ideally, top and bottom portions of upright frame struts may be provided with corresponding claw or arm arrangements so that similar frames are engageably stackable.

Preferably, frames 5 may be stacked atop each other by placing a foot 12 of a first frame A atop a shoulder 14 of a second frame B.

Figure 6:
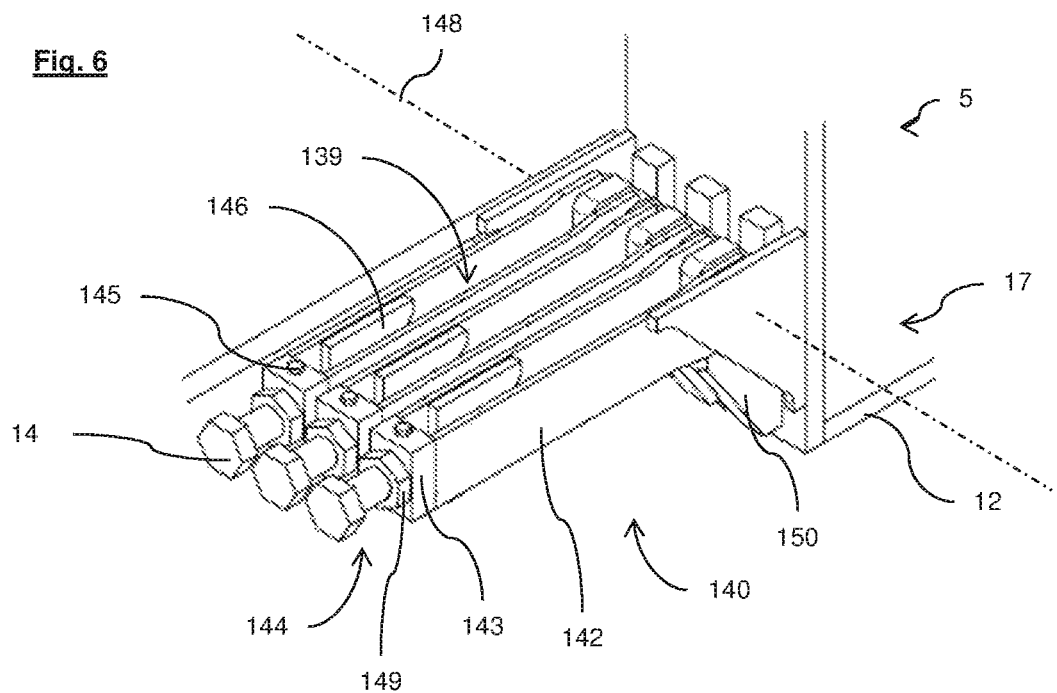
FIG. 6 shows a perspective cutaway view of a connector arm arrangement.

FIG. 6 shows an example of how a retractable arm arrangement 140 may be configured. The illustration shows a gang arrangement of three retractable arms 142, all hinged at a hinge body 150 and hingeably pivotable about hinge axis 148. In the example shown, the hinge axis may extend substantially parallel to transverse direction W of a blade 1 or frame 5. A retractable arm arrangement may nevertheless include only a single arm 142 or two arms 142 or more than three. In FIG. 6, the arms 142 are all shown in a retracted position thereof. In this position, the arms 142 may be secured at a catch 146 fixed to a portion of a blade frame 5 which, for clarity purposes is not shown. Suitably, a catch 146, or a set thereof may be located at a transverse or longitudinally extending frame strut 74, 94, 73, 93, not shown in FIG. 6. An arm 142 may extend along a longitudinal axis between a hinge point at one end and a connection portion at the other. In the example shown an arm has a tensioner 144 for secure engagement with a claw 162, illustrated here as a fixed claw, and preferably for imparting tension force to a connection between adjacent frames, tending to pull these securely together. In the example shown a tensioner 144 may comprise a longitudinal bolt 147 which may pass threadably through push plate 143. A rotation of the tension bolt 147 may thereby move the bolt in an engagement or release direction of the releasable arm 142. In the illustrated embodiment, the tensioner engages with the catch 146 to hold the arm 142 against the action of gravity suspended in a substantially horizontal orientation. In order to prevent dislodging of the arm, for example under the action of shocks or vibrations, a counter nut 149 may be provided and optionally also a locking nut 145. In a retracted position, there may be no need to apply considerable tension to the arms 142. Modest tension will suffice.

A retractable arm 142 may comprise a cavity 139, dimensioned to receive a fixed claw 162 when in an engagement position thereon. When in a retracted position, the cavity 139 may accommodate the catch 146. In aspects of the invention, a retractable arm 142 may comprise two longitudinally extending plates joined together at a hinge end and at a distal end. A hinge end thereof may include a hinge element which may be receivable in a hinge body 150. A distal end thereof may comprise a push plate 143 which may serve to connect together said distal ends of the opposing plates of an arm 142. In aspects, a catch 146 or a claw 162 may be positioned between said two opposing plates in a respective engagement or retracted position of an arm 142. Thereby, a tensioner 144 acting on the push plate 143, in particular through the same, may securely abut against respectively a retaining surface of said catch 146 or against an anvil surface of said claw.

Figure 7:
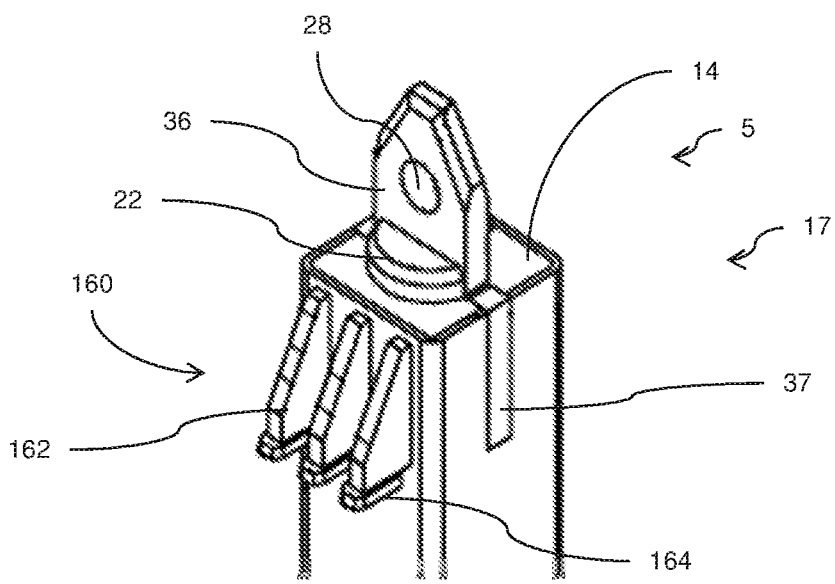
FIG. 7 shows a perspective view of a frame shoulder.

Conversely, at the opposite end of a same frame strut, and as illustrated in FIG. 7, there may be provided a claw arrangement 160. In the example shown the arrangement 160 also comprises a gang of claws 162 which in the case illustrated is three claws. These are configured to co-operate respectively with the three arms 142 of a retractable arm arrangement 140. The invention also encompasses embodiments in which a claw arrangement includes only one or two said claws 162 or more than three. Each claw 162 preferably comprises a landing point or anvil 164 configured to co-operate with a tensioner 144 at a retractable arm 142. In embodiments, it may be envisaged to provide a tensioner at a claw and a corresponding anvil 164 or landing point at a retractable arm 142. The claws 162 of a claw arrangement 160 are preferably especially shaped to engage with a tensioner 144 at a retractable arm and to provide secure engagement therewith while sustaining a high level of tension imparted by action of the tensioner 144.

Figure 8A:
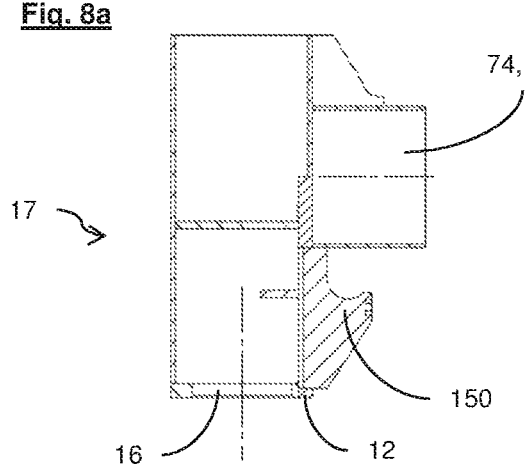
FIGS. 8a and 8b show cross section views of some details at a frame foot showing recesses therein and hinge blocks thereat.
Figure 8B:
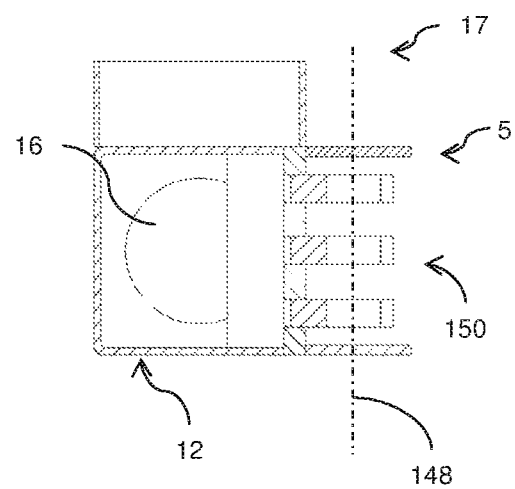
Figure 9A:
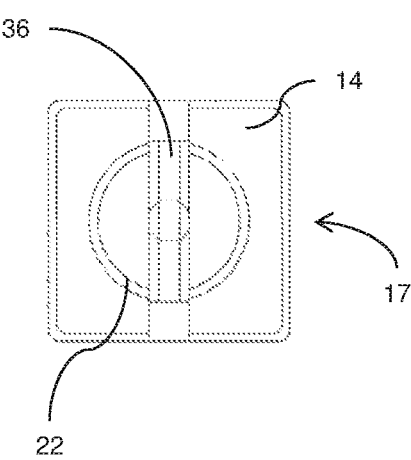
FIG. 9a shows a top view of a frame shoulder illustrating some particular features.
Figure 9B:
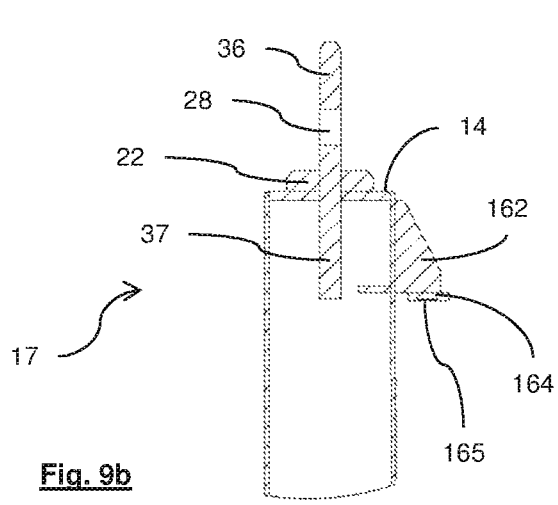
FIG. 9b shows a section view through a top corner of a frame.
Figure 9C:
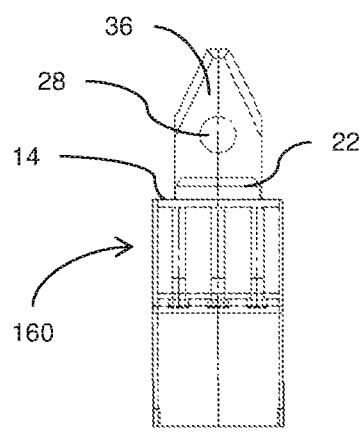
FIG. 9c shows a front view of some features at a top corner of a frame.

In FIGS. 8a and 8b, there is shown some detail of a hinge body 150 which in particular allows easy insertion of retractable arms 142 while at the same time providing a secure anchor point under tension applied by the tensioner 144. In FIG. 9b there is additionally shown a seat 165 in the form of a recess for securely receiving the end of a tensioner 144.

Figure 10:
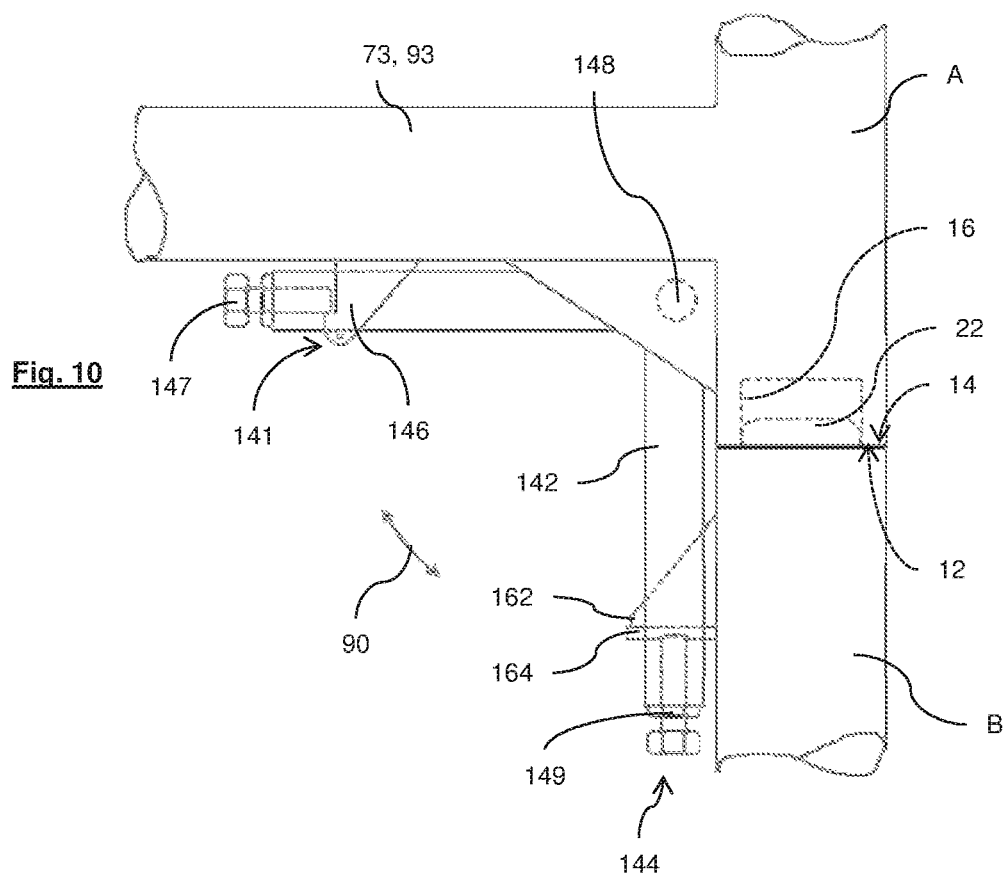
FIG. 10 shows an illustrative view of exemplary retractable arms during use in a frame stack.

The mode of operation of the arrangement is illustrated in FIG. 10, in which one retractable arm 142 of an arm assembly 140 is shown retracted while the other is shown engaged in a claw arrangement 160. A first frame A is placed atop a second frame B such that the foot 12 of the first frame A rests on the shoulder 14 of the second frame B. This may be carried out while all retractable arms 142 are in a retracted position, preferably at a respective catch 146. For added safety, a split pin or other locking element maybe passed through a catch 146 at a locking hole 141 therein to prevent accidental fallout from a retracted position. An operator may loosen the connector arm tightener 144 at a first retractable arm 142 at a corner 17 said first frame A. It may be necessary first to loosen or remove locking or blocking elements such as any split pins or lock nuts 145. The arm 142 may then be swung about its hinge axis 148 in the direction of arrow 90 into approximate engagement with a corresponding claw 62 in a claw arrangement 160 at corner 17 of a the adjacent, second frame B. Tension may be applied to the tensioner 144, in this case comprising a threaded bolt 147 passing through a push plate of the retractable arm 142. An operator may do this by simply turning the bolt 147 in a tightening direction, preferably using only hand tools. Access by an operator to the relevant part of a frame 5 may be ensured by providing appropriate platforms 25. Tightening may best be carried out by first loosening the counternut 149 at the connector arm tightener 144, and loosening any other locking nut 145. The tension bolt 147 may be tightened fully against the claw 162, preferably against an anvil 164 thereof and preferably engaging with a recess 165 therein. Therafter, a counternut 149 may be tightened and a lock nut 145 may optionally also be applied. Thereafter, a second and any subsequent retractable arm 142 may be swung into engagement in the same way. Optionally, the steps of securing a tightener 144 using a counternut 149 and/or a lock nut 145 may be left until all the arms 142 at a relevant assembly 140 have been tensioned in position at a corresponding fixing claw. An operator may thereby carry out successive re-tightening and balancing operations to ensure that a high level of tension is applied at each arm 142 and preferably that the level of tension at each arm is approximately equal. A torque wrench may be used. In any case, the operation is complete when all relevant arms 142 at each arm assembly 140 in a set of stacked frames are connected, tightened and secured. In this condition, the frames may be transported by any suitable means with, preferably, a reduced amount of lashing by virtue of the enhanced tension connection between adjacent frames 5 in a stack.

In additional aspects, as illustrated in FIGS. 7-11, there may be provided a raised abutment 22 atop one or more shoulders 14 of a transport frame 5. The raised abutment 22 may co-operate with a recess 16 in a frame foot 12. This arrangement may provide additional stability when the frames 5 are stacked. In the illustrated embodiments, the abutment 22 has a circular shape although any shape will be usable, provided that the abutment 22 and recess 16 are complementary. A locating fit between the abutment 22 and a recess 16 may be sufficient although it may be preferred, in embodiments, to provide a close tolerance fit in order to assist in resisting shear stresses incident on the frames during transport.

In further aspects, a preferably upwardly projecting guide finger 36 may be provided atop a shoulder 14 of a frame 5. These may be combined with a raised abutment 22 or they may be implemented independently thereof. A guide finger 36 may be tongue-shaped and may have a generally truncated point. This shape may be ideal for easing fitting of one frame 5 over another during stacking. They may also provide some additional, limited lateral stability to a frame stack although this is not their primary purpose. Preferably, a guide finger 36 may comprise a lifting point 28 capable of supporting the weight of a blade transport frame 5, in particular when two or more such guide fingers 36 are provided per blade frame 5. Preferably a guide finger 36 is provided at each shoulder 14. In the illustrated embodiments, a lifting point 28 is provided by way of a hole in a guide finger 36. The primary purpose of the lifting points 28 in the guide fingers 36 is to enable a blade frame 5 or a stack of blade frames to be picked up from above using a lifting element 130 which engages with the guide fingers 36. This avoids the need for a lifting operation to additionally require connecting using the retractable arms 142 or claws 162. This is preferred because the secure engagement offered by the retractable arms 142 is aimed primarily at maintaining a secure, stacked configuration of blades 1 in blade frames 5 during transportation and also allowing stacked frames to be picked up as a stack by lifting equipment such as a crane. This can greatly speed up the process of loading onto a vessel or other transport platform, or unloading from the same. Moreover, the placement of lifting element 130 which may be any suitable lifting element such as yoke or spreader or sling or the like, may be made considerably quicker by enabling its attachment to the guide fingers 36. Since the lifting of a blade frame or stack of blade frames does not generally impart lateral forces to the relevant frame, it is possible to lift even the considerably weight of a stack of blades using the guide fingers. Preferably, in embodiments, a guide finger 36 may be configured with an anchor 37 which extends inside the blade frame shoulder 14, below the level of the shoulder 14. This arrangement may give additional strength for a lift, especially of a stack of blades 1 and frames 5. Therefore, a further advantage of the retractable arm connectors and claw arrangements according to the present invention is that they allow both secure transportation and also lifting of stacked frames without needing additional binding, connection or lashing.

Figure 11:
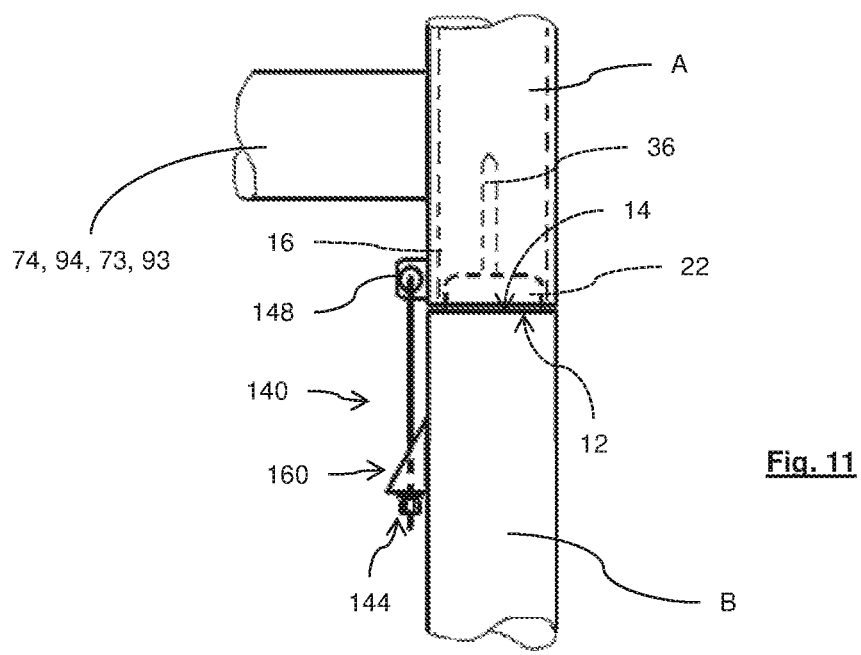
FIG. 11 shows an alternative arrangement of retractable arms in a stacked fame arrangement.
Figure 12:
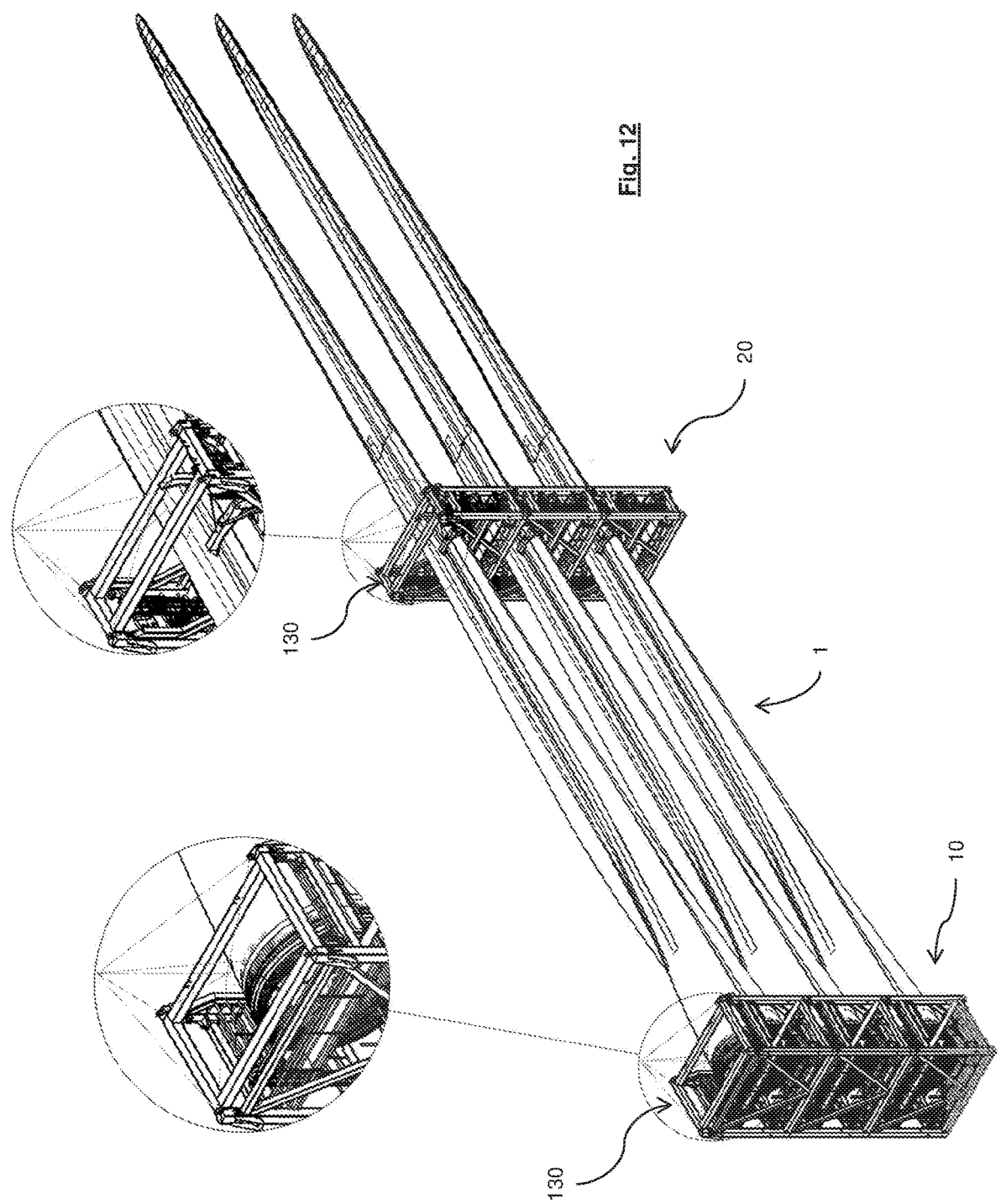
FIG. 12 shows aspects of a lifting operation for stacked wind turbine blades.

FIG. 11 illustrates an alternative embodiment in which a guide finger 16 at a shoulder 14 of a second frame B projects inside a recess 16 in a foot 12 of a first frame A. The tensioner 144, by way of a nut on a threaded arm 140 is simpler than the one previously illustrated in FIG. 10. This arrangement may be suitable for slightly lighter blades 1 or blade stacks. As can be seen in FIG. 11, the tolerance between an abutment 22 and a recess internal size 16 is wider than the tolerance illustrated in the stacked frames in FIG. 10. The term retractable does not necessarily imply retractability in a vertical direction although this is one possibility and has been illustrated. Preferably the term retractablity implies the capability to be moved between an engagement position and a retracted, non-engagement position in relation to a catch such as a claw. FIG. 12 illustrates figuratively a lifting operation of a stack of blades 1 in their root and tip frame pairs 10, 20. The stacked frames are connected using retractable arm arrangements 140 as described herein, while the topmost frame of each stack is quickly and easily connected to a lifting element 130, shown as a yoke, by means of guide fingers 36 atop each shoulder of each tip and root frame 20, 10.

The examples illustrated herein show a variety of optional features not all of which need to be combined together in the context of the invention. On the other hand, all and any recited features may be combined together unless prevented by the laws of physics or unless manifestly impossible for another reason.

The invention claimed is:

1. A transport frame having a longitudinal, lateral and upright extent, and being configured for receiving a tip or root portion of a longitudinally extending wind turbine blade, said transport frame being stackable with an adjacent transport frame, said transport frame comprising:
   four upright frame struts which together define a generally cuboid internal space having a longitudinal extent between two pairs of said upright struts;
   a tip or root saddle assembly comprising a saddle with a support surface shaped to receive a respective blade root or tip, the tip or root saddle assembly being disposed within the generally cuboid internal space;
   four top shoulders and four feet, said feet configured to be stackable on corresponding said shoulders of the adjacent transport frame;
   a retractable arm arrangement proximate one or more top or bottom corner of the transport frame, the retractable arm arrangement having a retractable arm pivotably coupled to the top or bottom corners, the retractable arm having a tensioner coupled to the retractable arm, and the retractable arm being pivotable between a retracted position and an engaged position; and
   a claw arrangement with a fixed claw proximate at least one top or bottom corner of the transport frame;
   wherein when the retractable arm is in the retracted position, said tensioner is configured to selectively retain the retractable arm in the retracted position, and
   wherein when the retractable arm is in the engaged position and the transport frame and the adjacent transport frame are in a stacked arrangement, the tensioner is configured to selectively fixingly engage a fixed claw of a claw arrangement on the adjacent transport frame to thereby secure the transport frame to the adjacent transport frame.

2. The transport arm according to claim 1, wherein said tensioner is manually operable by an operator, to apply tension between the transport frame and the adjacent transport frame.

3. The transport frame according to claim 1, wherein the retractable arm is pivotably coupled to the top or bottom corners so as not to protrude beyond said transport frame when in a retracted position.

4. The transport frame according to claim 1, wherein said retractable arm arrangement comprises a gang of two or more retractable arms and wherein said claw arrangement comprises two or more fixed claws.

5. The transport frame according to claim 4, wherein each said retractable arm of said retractable arm arrangement is individually movable into engagement with a corresponding claw at said claw arrangement.

6. The transport frame according to claim 1, wherein said retractable arm arrangement is provided at two or more of said top or bottom corners thereof.

7. The transport frame according to claim 1, wherein said claw arrangement is provided at two or more of said top or bottom corners thereof.

8. The transport frame according to claim 1, wherein each said shoulder is additionally provided with a raised abutment having a height above said shoulder, and wherein each said foot is provided with a recess conformed to receive a said abutment in a locating engagement in a stacked configuration of transport frames.

9. The transport frame according to claim 1, wherein two or more or each said shoulder is additionally provided with an upwardly protruding locating finger, each said finger having a height above said shoulder, and wherein each said finger is provided with a lifting aperture configured as a load bearing lifting point for lifting said transport frame or a stack of said transport frames.

10. The transport frame according to claim 9, wherein one or more said finger includes an anchor portion extending below said shoulder, into a strut of said transport frame.

11. The transport frame according to claim 1, wherein said retractable arm assembly additionally comprises, for each retractable arm thereof, a catch configured to securely retain said retractable arm in the retracted position at said transport frame.

12. A method of transporting a stack of wind turbine blades, said method comprising:
providing first and second transport frames each according to claim 1, said first and second transport frames containing a first wind turbine blade;
providing third and fourth transport frames each according to claim 1, said third and fourth transport frames containing a second wind turbine blade;
placing third and fourth transport frames atop and adjacent said first and second transport frames by placing a foot of said third and fourth transport frames on a shoulder of said first and second transport frames, respectively, and
releasing a retractable arm of a retractable arm arrangement from a retracted position thereof and placing it over a claw of a claw arrangement of said adjacent transport frame in said stack, and actuating a tensioner at said retractable arm to create a connection under tension between said two adjacent transport frames in a stack;
lifting the stack of two wind turbine blades by connecting a lifting element to the topmost transport frame of said stack and lifting the stack, wherein each transport frame in each transport frame stack is suspended from and lifted by the transport frame immediately above it; and
transporting said stack of wind turbine blades aboard a transport platform.

13. The method according to claim 12, said method further comprising individually releasing each one of a gang of said retractable arms of said arm arrangement from a retracted position thereof and placing each one over a corresponding claw of said claw arrangement of said adjacent transport frame in said stack, and manually actuating each said tensioner at each said retractable arm to create a said connection under tension between said two adjacent transport frames in a stack.

14. The method according to claim 12, further comprising connecting a lifting element to two or more load bearing lifting apertures at a locating finger on two or more top shoulders on each transport frame and lifting said stack suspended by said load bearing lifting apertures.

15. A stack of wind turbine transport frames, each transport frame in said stack comprising:
four upright frame struts which together define a generally cuboid internal space having a longitudinal extent between two pairs of said upright struts;
a tip or root saddle assembly comprising a saddle with a support surface shaped to receive a respective blade root or tip, the tip or root saddle assembly being disposed within the generally cuboid internal space;
four top shoulders and four feet, the feet configured to be stackable on the corresponding shoulders of an adjacent transport frame, wherein two or more or each of the shoulders has an upwardly protruding locating finger with a height above the shoulder, and wherein each finger is provided with a lifting aperture configured as a load bearing lifting point;
a retractable arm arrangement proximate one or more top or bottom corner of the transport frame, retractable arm arrangement having a retractable arm pivotably coupled to the top or bottom corners, the retractable arm having a tensioner rotatably coupled to the retractable arm, the retractable arm being pivotable between a retracted position and an engaged position; and
a claw arrangement with a fixed claw proximate at least one top or bottom corner of the transport frame;
wherein the retractable arm of one of the transport frames is in the engaged position to fixedly engage the fixed claw of an immediately adjacent transport frame such that each transport frame in the stack is interconnected to an immediately adjacent transport frame; and
wherein the stacked transport frames are configured to be lifted from the lifting aperture of the topmost transport frame of the stacked transport frames and the lower transport frames in the stack are suspended from and lifted by the transport frame immediately above it.

16. A transport frame having a longitudinal, lateral and upright extent, and being configured for receiving a tip or root portion of a longitudinally extending wind turbine blade, said transport frame being stackable with an adjacent transport frame, said transport frame comprising:
four upright frame struts which together define a generally cuboid internal space having a longitudinal extent between two pairs of said upright struts;
a tip or root saddle assembly comprising a saddle with a support surface shaped to receive a respective blade root or tip, the tip or root saddle assembly being disposed within the generally cuboid internal space;

four top shoulders and four feet, said feet configured to be stackable on corresponding said shoulders of the adjacent transport frame;

a retractable arm arrangement proximate one or more top or bottom corner of the transport frame, the retractable arm arrangement having a retractable arm, the retractable arm having first and second spaced apart plates forming a cavity therebetween, one end of the first and second plates being pivotably coupled to the top or bottom corners, the retractable arm having a tensioner rotatably mounted to the other end of the first and second plates, the retractable arm being pivotable between a retracted position and an engaged position; and a claw arrangement with a fixed claw proximate at least one said top or bottom corner of the transport frame, the fixed claw sized to fit within the cavity when the retractable arm is in the engaged position;

wherein said tensioner is configured to fixingly engage a fixed claw of a claw arrangement on the adjacent transport frame in a stacked arrangement of the transport frames when the retractable arm is in the engaged position to thereby secure one transport frame to the adjacent transport frame.

* * * * *